No. 880,999. PATENTED MAR. 3, 1908.
W. P. IBBITSON.
CORN PLANTER.
APPLICATION FILED OCT. 25, 1906.

3 SHEETS—SHEET 1.

Witnesses

Inventor
W. P. Ibbitson.
By
Attorneys

No. 880,999. PATENTED MAR. 3, 1908.
W. P. IBBITSON.
CORN PLANTER.
APPLICATION FILED OCT. 25, 1906.
3 SHEETS—SHEET 2.
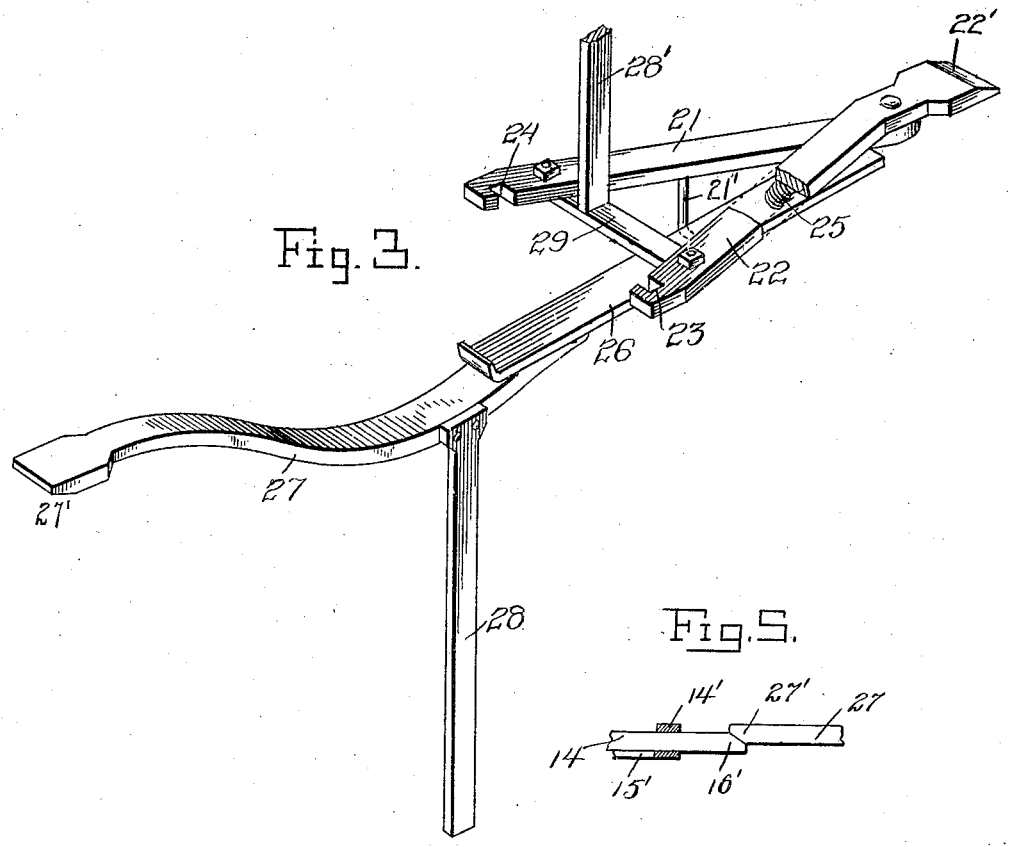
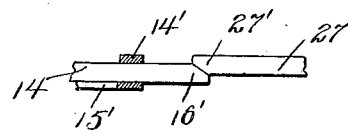
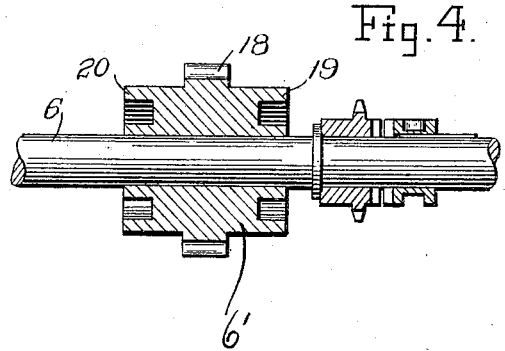
Witnesses
Inventor
W. P. Ibbitson
By
Attorneys No. 880,999. PATENTED MAR. 3, 1908.
W. P. IBBITSON.
CORN PLANTER.
APPLICATION FILED OCT. 25, 1906.

3 SHEETS—SHEET 3.

WITNESSES:

INVENTOR
W. P. Ibbitson
BY
Attorneys

UNITED STATES PATENT OFFICE.

WILLIAM P. IBBITSON, OF HENRY, SOUTH DAKOTA.

CORN-PLANTER.

No. 880,999.   Specification of Letters Patent.   Patented March 3, 1908.

Application filed October 25, 1906. Serial No. 340,563.

*To all whom it may concern:*

Be it known that I, WILLIAM P. IBBITSON, a citizen of the United States, residing at Henry, in the county of Codington, State of South Dakota, have invented certain new and useful Improvements in Corn-Planters; and I do hereby declare the following to be a full, clear, and exact description of the invention, such as will enable others skilled in the art to which it appertains to make and use the same.

This invention relates to corn planters, and has for its object to provide a planter of the wireless type, which will operate to plant grain at regular intervals, and which will include a marker to indicate the position of the planted grain for guidance during the planting of subsequent rows.

Another object is to provide a machine of this kind in which the marker will be adjustable so that the machine may be set to correctly plant a row of corn, as will be readily understood.

Other objects and advantages will be apparent from the following description, and it will be understood that changes in the specific structure shown and described may be made without departing from the spirit of the invention.

Figure 1:
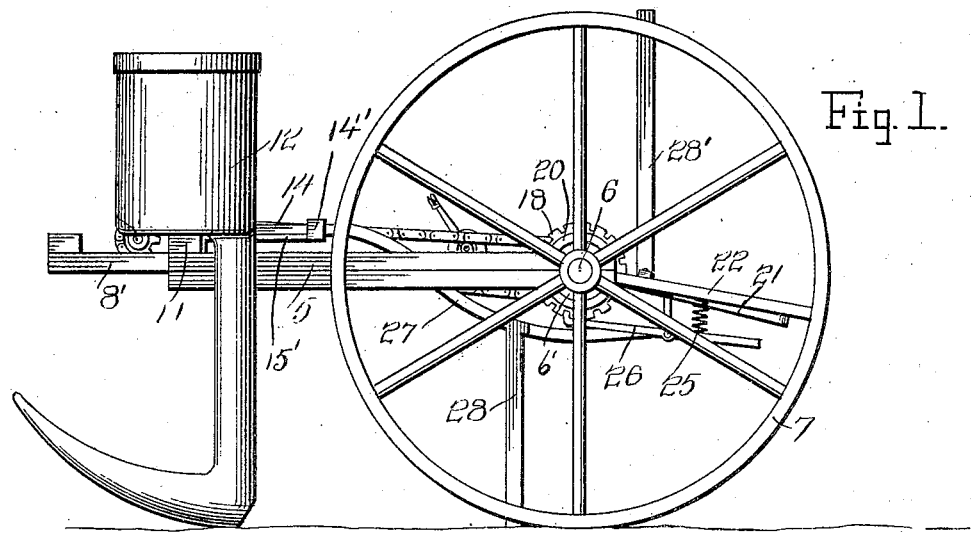
Figure 2:
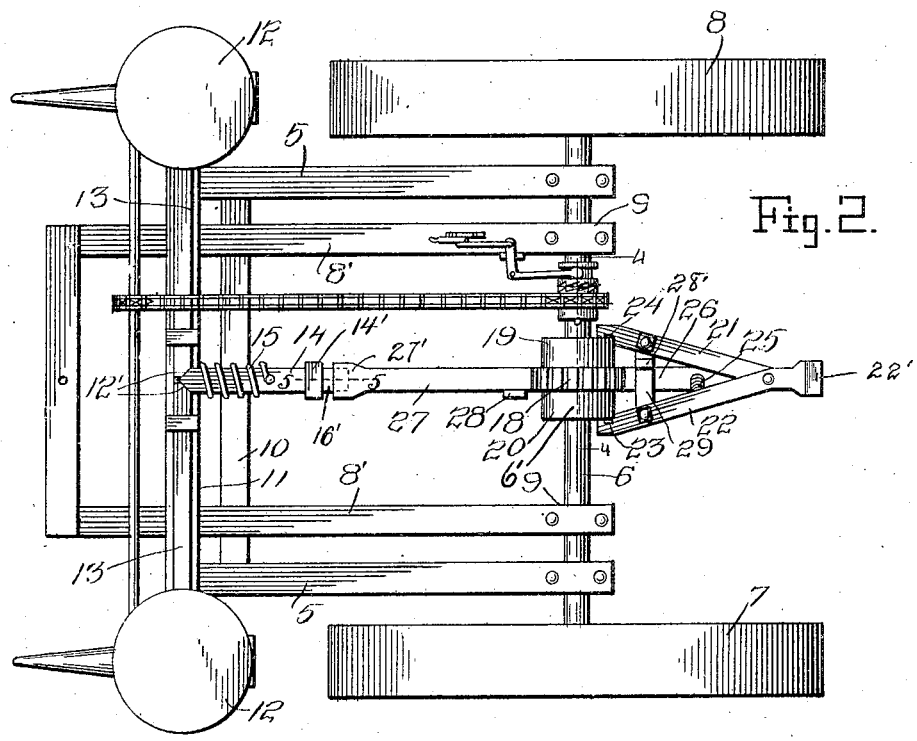
Figure 6:
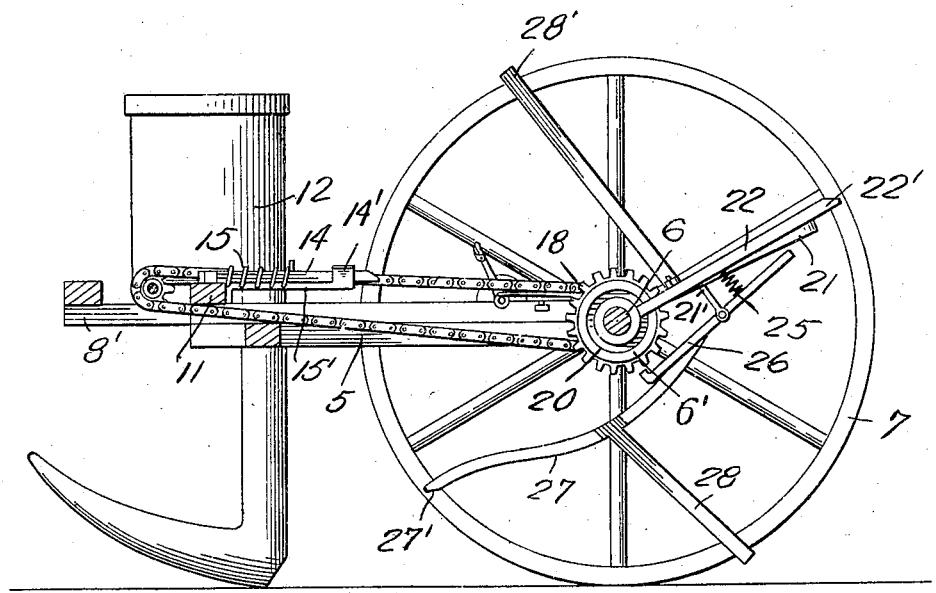

In the drawings forming a portion of this specification, and in which like numerals of reference indicate similar parts in the several views, Figure 1 is a side elevation of the present invention, Fig. 2 is a top plan. Fig. 3 is a perspective view of the tripping mechanism. Fig. 4 is a detail section through the rack and clutch. Fig. 5 is an enlarged sectional view taken on line 5—5 of Fig. 2. Fig. 6 is a longitudinal vertical section taken through Fig. 2, and showing markers in a different position from that shown in Fig. 1.

Referring more particularly to the drawings, the planter frame is shown as including a pair of sills 5, which carry at their rearward ends the axle 6 provided with the fixed and loose traction wheels 7 and 8, respectively, the wheels thus being capable of differential motion with respect to each other.

Mounted between the sills 5 and arranged in spaced relation thereto and to each other is a pair of longitudinal beams 8', which are likewise provided at their rear ends with bearings 9, in which the axle 6 is revolubly engaged, the beams being connected together at their forward ends by a cross-beam to which a whiffle-tree, to which the draft animals are hitched, is adapted to be attached. The beams 8' are supported towards their forward ends by a cross-beam 10, which connects the front ends of the sills 5. Mounted upon the upper faces of said sills, adjacent the beam 10, is a supporting beam 11, upon each end of which a hopper 12 is fixed, the hoppers being provided with the grain discharge slides 13 of the usual type, said slides being disposed in alinement with each other, with their mutally adjacent ends beveled rearwardly, as at 12', for engagement by the beveled forward end of a trip finger 14, slidably mounted in the eye portion 14' of a rearwardly extending rod 15' secured to the beam 11, as shown in Figs. 1, 2, and 5. The opposite end of the finger 14 is beveled, as indicated by the reference numeral 16' in Fig. 5.

The finger 14 is yieldingly held against forward movement by means of an expansible coil spring 15 which is secured at one end to said finger and bears at its opposite end against the beam 11. When, however, said finger is moved forwardly against the action of spring 15, as hereinafter described, its front end will be forced between the beveled ends of the discharge slides 13, moving the latter away from each other, causing them to enter the corresponding hoppers and discharge the grain contained therein through the usual shoes or furrow openers.

Secured upon the axle is a collar 6' provided intermediate its ends with a rack 18 formed exteriorly thereupon, the opposite ends of the collar having annular seats countersunk therein which form the similarly shaped flanges 19 and 20, as shown in Fig. 4. Disposed rearwardly of the collar 6' above referred to is a V-shaped tripping frame comprising a pair of arms 21 and 22, pivoted together adjacent their rear ends, the arm 22 having such end rearwardly beveled as indicated by the numeral 22'. The forward ends of the arms 21 and 22 are disposed in spaced relation to each other, as shown in Figs. 2 and 3, and the former is provided on its inner face at such point with a notch 24 adapted to receive the flange 19, while the latter is provided with a similar notch 23, in which the flange 20 is engaged. The arm 21 is further provided with a depending hanger 21', the free end of which is bent laterally to form a pivot upon which a dog 26 is mounted intermediate its ends, said dog alining with the rack 18, with its forward end in engagement therewith, being held normally in such position through the medium of a coil spring 25, which bears at opposite ends against the rear end of the dog and the under face of arm 22, as shown in Figs. 3 and 6. It will therefore be apparent that when the notched arms 21 and 22 are engaged with the flanges of the collar 6', and the dog and rack are likewise engaged, the entire V-shaped tripping frame will revolve bodily about the axle when the latter is rotated.

The dog above referred to carries a trip arm 27 which is disposed longitudinally of the machine in alinement with the finger 14, the free end of said arm being oppositely beveled, as at 27', with respect to the end 16' of said finger. When, therefore, the V-shaped frame is revolved about the axle, the beveled ends of the arms 22 and 27 will contact alternately with the beveled end 16' of the finger 14, as shown in Fig. 5, at regular periods, and will move said finger forwardly against the action of the spring 15, the engagement between the oppositely beveled ends of said arms and finger causing the forward movement of the latter, the front end of which contacting with the beveled inner ends of the discharge slides 13, forces the latter away from each other, as above described. The trip arm 27 carries toward its rear end, a depending marker 28, while an upstanding marker 28' is provided upon a cross-strip 29, which detachably connects the free ends of the arms 21 and 22 with each other, it being thus possible to disengage said strip from one of said arms and then elevate the spring end of the dog 26, when said arms may be easily removed from engagement with the collar by moving their inner ends away from each other.

It will be apparent from the foregoing, that the free end of a marker engages the ground approximately simultaneously with each discharge of grain from the hoppers, so that a mark is made a given distance rearwardly of each deposit of grain. When, therefore, a field is to be planted, the position of the V-shaped trip frame with respect to the rack is so adjusted on beginning a row that the marks made by the markers will aline, transversely of the rows, with the previously made marks, thus insuring planting of the grain in straight rows, transversely of the field. The entire trip frame may be removed bodily from the axle, if desired, and the machine used for drilling.

What is claimed is:

1. In a machine of the class described, the combination, with a frame and an axle revolubly mounted in the frame, of a collar revolubly mounted upon said axle; hoppers mounted in the frame; mechanism carried by the frame and connected with the hoppers for effecting a discharge therefrom; trip arms connected with the collar for rotation therewith, and arranged to successively engage the discharge mechanism to operate the latter at definite periods, said arms being shiftable with respect to the collar; and means for holding the arms at different points of their movement.

2. In a machine of the class described, the combination with a frame, of an axle revolubly mounted in the frame; means for driving the axle; hoppers mounted in the frame; mechanism carried by the frame and connected with the hoppers for effecting a discharge therefrom; a trip arm connected with the axle for rotation therewith, said trip arm being adapted to engage a portion of the discharge mechanism at definite periods to operate the latter, said arm being shiftable with respect to the axle; means for holding the arm at different points of its movement; and a marker connected with the arm and adapted for bodily rotation therewith.

3. In a machine of the class described, the combination with a frame, of an axle journaled in the frame; wheels mounted upon the axle; a rack collar rotatably mounted upon the axle and having oppositely extending flanges; an arm having a notch in which one of the flanges is engaged; an arm connected with said first-mentioned arm for movement toward and away from the latter and having a notch in which the other flange is engaged; detachable means for holding said arms against separation; a dog connected with the first mentioned arm, for movement into and out of engagement with the rack; means for holding the dog yieldably in engagement with the rack; a second arm connected with the dog and extending oppositely to the first named arm; markers carried by the arms; hoppers mounted on the frame; mechanism carried by the frame and connected with the latter for effecting a discharge therefrom; and an endwise movable member carried by the frame and operatively connected with said discharge mechanism, said member lying in the path of movement of said arms and arranged for engagement therewith at definite periods to operate said discharge mechanism.

In testimony whereof, I affix my signature, in presence of two witnesses.

WILLIAM P. IBBITSON.

Witnesses:
ALBERT SCHOEPF,
R. F. LENZ.